United States Patent
Montanari

[15] 3,654,399
[45] Apr. 4, 1972

[54] SOUND EFFECT GENERATOR WITH ROTATING MAGNETIC DISK

[72] Inventor: Sergio Montanari, Via Irnerio 22, Bologna, Italy

[22] Filed: May 8, 1970

[21] Appl. No.: 35,678

[52] U.S. Cl. ..................179/100.2 A, 84/1.28, 179/100.2 A, 179/100.2 CA, 179/100.2 R, 274/41.4
[51] Int. Cl. ..........................................G10h 3/04, G11b 5/82
[58] Field of Search ..........................179/100.2 CA, 100.2 A; 346/74 MD; 340/174.1 E, 174.1 H; 84/1.01, 1.28, D 29; 156/205, 290; 274/41.4, 42; 161/122, 121, 139, 123; 117/234, 239

[56] References Cited

UNITED STATES PATENTS

| | | | |
|---|---|---|---|
| 3,135,949 | 6/1964 | Whyte | 346/74 MD |
| 3,334,007 | 8/1967 | Flagan | 161/139 |
| 2,574,707 | 11/1951 | Pettus | 179/100.2 CA |
| 2,594,893 | 4/1952 | Faus | 179/100.2 A |
| 3,033,943 | 5/1962 | Archer | 179/100.2 A |
| 2,897,288 | 7/1959 | Wijchman | 179/100.2 CA |

OTHER PUBLICATIONS

Adjustable Magnetic Head, A. B. Habich, IBM Tech. Discl. Bulletin, Vol. 10, No. 12, May, 1968, p. 1906.

*Primary Examiner*—Bernard Konick
*Assistant Examiner*—Jay P. Lucas
*Attorney*—Clario Ceccon

[57] ABSTRACT

A sound effects generator using the playback of signals from an enclosed rotating magnetic disk to produce the sound. Features include a magnetic disk glued to a ventilated groove on a rotating flywheel, and an adjustable head.

2 Claims, 3 Drawing Figures

INVENTOR.
SERGIO MONTANARI

SOUND EFFECT GENERATOR WITH ROTATING MAGNETIC DISK

BACKGROUND OF THE INVENTION

This invention relates to an improvement in a sound effect generating device of the magnetic type.

Among the magnetic sound effect generators, those with a rigid magnetic support and with magnetic transducer heads separated from the magnetic support have been shown to be greatly superior to those using rings of magnetic tape, in so far as any wear of the heads and tape is eliminated and a better response and greater stability are obtained. The merits of generators with rigid magnetic supports are greater when the magnetic support and the recording, reproducing and erasing heads form a hermetically sealed unit in which these delicate elements are protected against any damage from atmospheric dust or humidity for example.

One of the most successful forms of sound effects generators is that which comprises the use of a flywheel of nonmagnetic material which rotates about a hollow shaft with the interposing of anti-friction means and on one face of which is glued a rim of magnetic material. This rim is arranged opposite a preferentially discoidal element which is rigid with the hollow shaft and on which the magnetic heads are mounted in radial formation.

When a cover is attached to the element to which the magnetic rim is fixed and when the bore of the hollow shaft through which the terminals of the magnetic heads leave has been filled with a suitable hardening substance, the apparatus presents a high degree of compactness and resistance. On the other hand such an apparatus is of very laborious construction, because it is essential that the magnetic rim is perfectly flat so that the distance between it and the magnetic heads is constant in every case. The constructional difficulties arise in fixing said magnetic rim to the flywheel because with known arrangements it is almost inevitable that air bubbles remain between the magnetic rim and the flywheel or that the layer of fixing adhesive is not uniform. In order to remedy these difficulties various devices have been provided which have proved satisfactory as regards the uniformity of the adhesive layer but not as regards the complete elimination of air, without giving rise to delicate flywheel balancing problems.

SUMMARY OF THE INVENTION

According to the invention there is provided an improved sound effect generator comprising a hollow shaft member, a flywheel member of non-magnetic material mounted for rotation on said hollow shaft member, support means secured to said hollow shaft above said flywheel member, a plurality of magnetic heads supported by said support means above a face of said flywheel member, wire means from said magnetic heads passing along said hollow shaft member, a continuous groove formed in said flywheel member on the face thereof opposite said plurality of magnetic heads and arranged to define a continuous shallow portion and a continuous rib portion in said flywheel member, and a rim of magnetic material fixed to said rib portion by means of an adhesive material and in facing relationship with said magnetic heads.

BRIEF DESCRIPTION OF THE DRAWING

Further characteristics and advantages will appear from the detailed description of one embodiment of a sound effect generator according to the invention which is illustrated in the accompanying drawing in which.

DESCRIPTION OF THE PREFERRED EMBODIMENT

Figure 1:
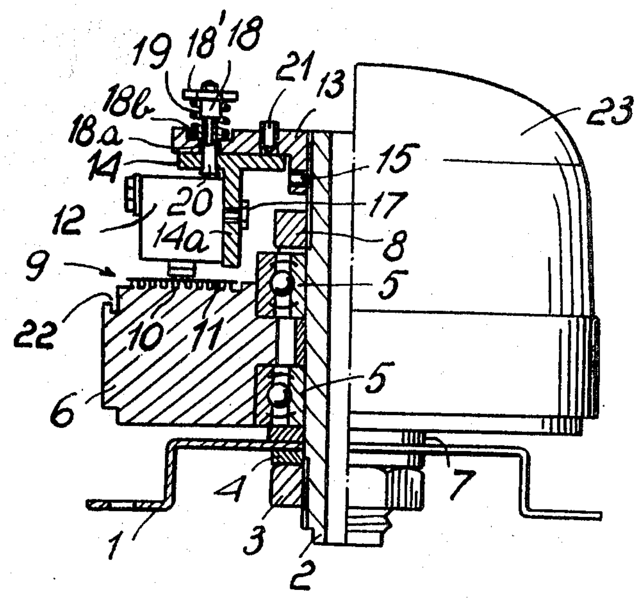
FIG. 1 is a partially sectional elevation of a complete generator.

Referring to said Figures, reference numeral 1 indicates a laminar element of U-shape, which supports the whole of the generator and can be secured to external elements. Reference numeral 2 indicates a hollow shaft fixed to said U-shaped element 1 by a nut 3 and washer 4. A pair of rolling bearings 5 of the closed self-lubricating type are keyed onto said hollow shaft and support a flywheel 6, of non-magnetic material. The bearings which support said flywheel are retained between a ledge 7 of the shaft 2 and a ring nut 8 which is screwed onto the upper threaded part of said shaft. Said ledge 7 also acts by virtue of its other face as a shoulder for fixing the shaft to the member 1. The flywheel 6 has a rised rim 9 formed on its upper part in which a shallow spiral groove 10 is cut with a relatively small pitch and which preferably is of regular section and in particular square. A rim or disk 11 of ferromagnetic material in the form of a thin leaf is fixed by means of adhesive to the upper surface of the spiral projection of the rim 9. The function of the grooves of the raised rim 9 of the flywheel is that of receiving the excess of adhesive material and to permit air imprisoned between the rim 9 of the flywheel and the rim 11 of magnetic material to be removed during the glueing operation, so ensuring a perfectly flat positioning of the magnetic rim.

The working parts of a series of magnetic tape reproduction heads together with at least one recording head and at least one erasing head are arranged to face the upper face of the rim 11 of ferromagnetic material. Said heads are generically indicated at 12 and are supported in the desired position by a flange 13 with the intermediate support members 14. Said flange 13 is rigidly secured to the upper part of the shaft 2 by screwing down a central collar (not shown) and by the action of a series of screwed dowels, one of which is indicated by the reference numeral 15, and which act in the radial sense on the tubular shaft 2. The head supports 14, arranged in ray-like formation, are substantially T-like elements (see FIG. 3) to the rib 14*a* of which are fixed the heads by means of screws 17.

Figures 2, 3:
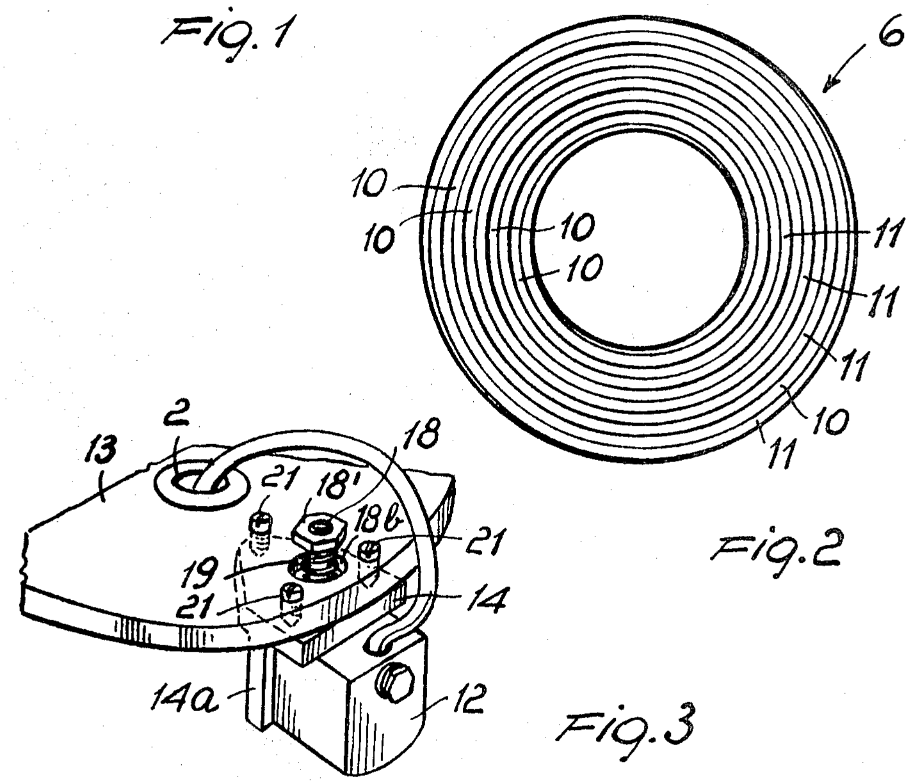
FIG. 2 shows the upper rim of the flywheel with the groove suitably enlarged.
FIG. 3 is a perspective view of the support which holds the various heads together.

Each head support has a hole 18*a* into which a stud 20 is firmly fixed. On said stud a nut 18 is screwed against which a helical spring 18 acts which also acts on the bottom of an annular hollow 18*b* concentric with the hole 18*a* and through which the shaft of said stud extends. In FIG. 3, instead of using the nut 18 and stud 20, a bolt 18′ is used screwed into the corresponding threaded hole of the support 14. The spring urges the corresponding support such that the upper surface of the latter engages with the pointed ends of three screwed dowels 21 arranged as a triangle. With dowels 21 it is possible to establish the desired position relationship of each head relative to the rim of magnetic material. A seat 22 is formed in the upper periphery of the flywheel 6 into which the edge of a cover 23 is inserted. In said seat 22 some adhesive material may be provided. The heads 12 are retained in a previously selected position, by means of a binding material.

The wires from the heads extend outside through the bore of shaft 2 which is then filled with a hardening material.

The flywheel 6 is connected to a motion source and the operation of the device described is thus simple and obvious.

As may be seen, the invention substantially eliminates all previous constructional difficulties, by providing a sound effect generator which with a relatively simple construction allows the magnetic sub-layer to be placed on its relative support in a perfectly positioned manner without giving rise to non-uniformity in the adhesive layer or imprisoning of air which would compromise the operation of the apparatus.

Furthermore the invention provides a single unit in which the recording, erasing and reproducing heads can be adjusted during assembly in order to obtain the optimum response curve and then firmly locked in such a position so that once the assembly is hermetically sealed, the operational characteristics remain substantially unaltered with time.

I claim:

1. In a sound effect generator comprising a hollow shaft member, a flywheel member of non-magnetic material mounted for rotation on said hollow shaft member, support means secured to said hollow shaft above said flywheel member, a plurality of magnetic heads supported by said support means above a face of said flywheel member, wire means from said magnetic heads passing along said hollow shaft member, the improvement comprising a continuous groove formed in said flywheel member on the face thereof opposite said plurality of magnetic heads and arranged to define a continuous shallow portion and a continuous rib portion in said flywheel member, and a disk of magnetizable material fixed to said rib portion by means of an adhesive material and in facing relationship with said magnetic heads so as to allow air passage from the said shallow portion of the flywheel member to the outside when the said disk is affixed.

2. The improvement in a sound effects generator as claimed in claim 1, in which said continuous groove is a spiral groove having a preferably small pitch and a preferably square cross-section.

* * * * *